United States Patent [15] 3,684,953
Grant [45] Aug. 15, 1972

[54] SINGLE FREQUENCY MOISTURE GAUGE WITH TWO-CHANNEL DEMODULATION AND FEEDBACK CONTROL OF INPUT

[72] Inventor: Michael P. Grant, Columbus, Ohio
[73] Assignee: Industrial Nucleonics Corporation
[22] Filed: Dec. 21, 1970
[21] Appl. No.: 100,251

[52] U.S. Cl. ................................................. 324/61
[51] Int. Cl. ............................................ G01r 27/26
[58] Field of Search ......................... 324/57, 60, 61

[56] References Cited

UNITED STATES PATENTS

| 3,230,449 | 1/1966 | Kaiser | 324/60 |
| 3,387,776 | 6/1968 | Stillwell et al. | 324/61 |
| 3,443,219 | 5/1969 | Adams | 324/61 |
| 2,535,027 | 12/1950 | Anderson | 34/52 |
| 2,768,629 | 10/1956 | Maul | 131/135 |
| 2,769,338 | 11/1956 | Hermanson | 73/304 |
| 2,950,436 | 8/1960 | Butticaz et al. | 324/61 |
| 3,155,902 | 11/1964 | Walls | 324/61 |
| 3,241,062 | 3/1966 | Baird | 324/61 |
| 3,255,411 | 6/1966 | Norwich | 324/61 |
| 3,320,946 | 5/1967 | Dethloff et al. | 128/2.1 |
| 3,408,566 | 10/1968 | Norwich | 324/61 |
| 3,458,803 | 7/1969 | Maguire | 324/60 |

Primary Examiner—Stanley T. Krawczewicz
Attorney—Anderson, Luedeka, Fitch, Even & Tabin, William T. Fryer, III and C. Henry Peterson

[57] ABSTRACT

For quantitatively determining a property of a dielectric material, in particular its relative moisture content, an alternating current electrical signal at a constant frequency is applied to a capacitance probe coupled to the material. The effect of the capacitance of the empty probe is balanced out, and a detection signal is produced from unbalanced occasioned by the dielectric material. A control signal derived from the detection signal is used to vary the applied signal in a direction opposite to changes in the detection signal to reduce the demands upon the dynamic range of system components. The ratio of detection signal to applied signal is used as an indication of the property of the material.

9 Claims, 2 Drawing Figures

PATENTED AUG 15 1972
3,684,953
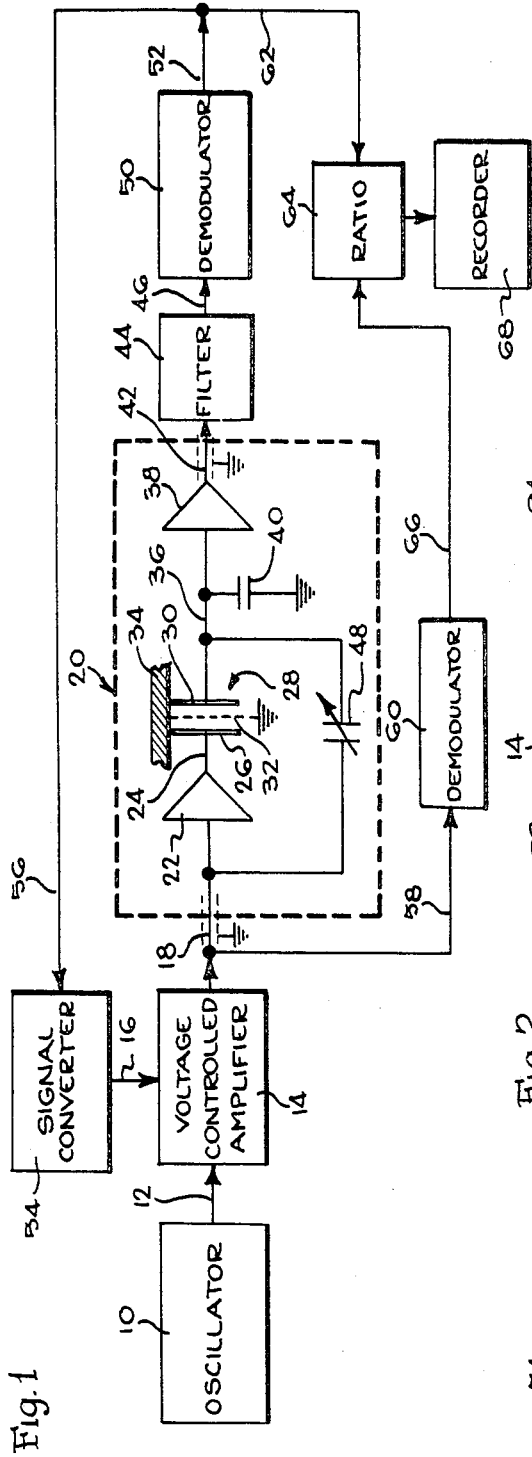
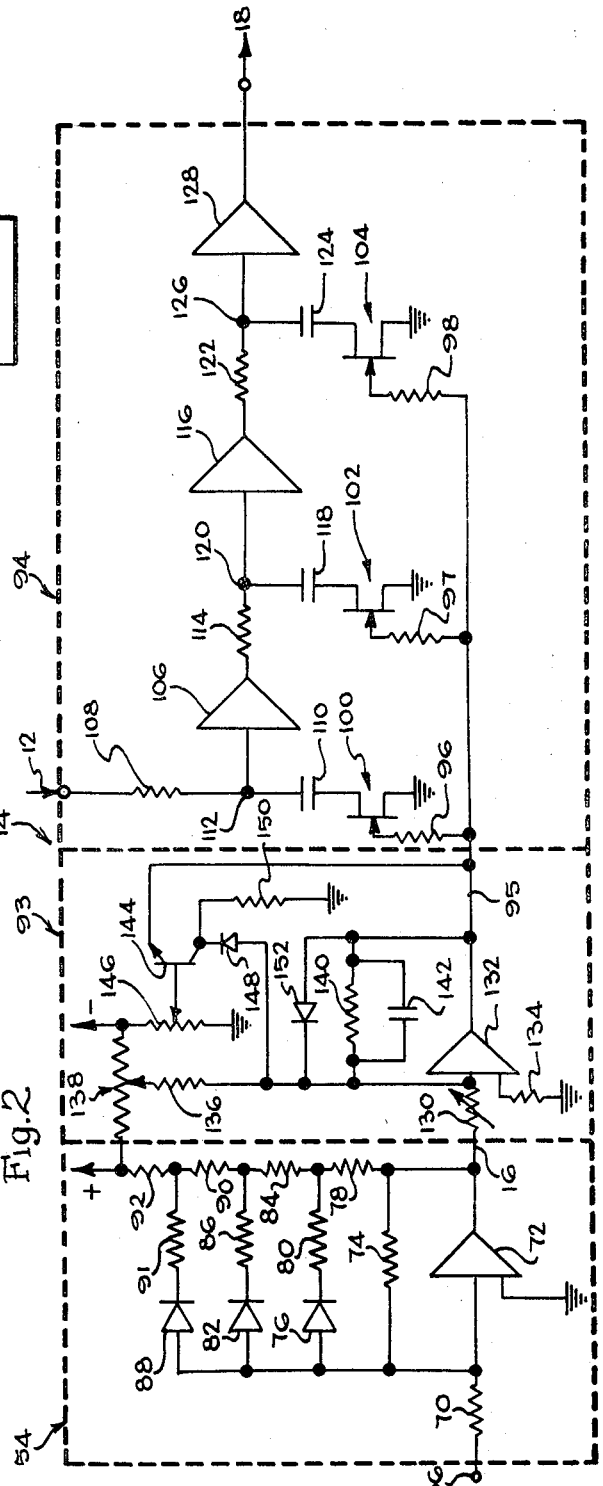
INVENTOR
*Michael P. Grant*
*Anderson, Luedeka, Fitch, Even, & Tabin*
ATTYS.

SINGLE FREQUENCY MOISTURE GAUGE WITH TWO-CHANNEL DEMODULATION AND FEEDBACK CONTROL OF INPUT

This invention is directed generally to the quantitative determination of a property of a dielectric material, and more particularly to the continuous measurement of moisture content in a continuous product by means of a capacitance probe energized at a single constant frequency. It is still more particularly directed to a single frequency moisture gauge wherein a portion of the detected signal is utilized to control the applied signal to reduce the range of the signals being processed, while the property being measured varies over a large range.

It has been previously known to measure the moisture content of a dielectric material by utilizing the material as the dielectric of a capacitance probe and measuring the effect of the moisture upon the dielectric constant of the material. In certain of the prior art it has been known to utilize a two-frequency moisture gauge in order to measure moisture independent of the variations in mass. While this prior art has been particularly satisfactory under the conditions for which it was designed, as for example, in measuring the moisture content of thin, relatively dry paper, it has proven difficult to measure accurately the moisture content of a relatively heavy paper, such as kraft or liner board, where the moisture in the product is layered, the product being relatively dry on the outside but having a moisture content up to 15 percent or so in its interior.

For measurement of the moisture of such heavy paper, it has been found suitable to utilize a moisture gauge at a single frequency, for although the measurement is not truly independent of mass, the relative effect of mass upon the moisture measurement is less for the heavy papers and can generally be ignored or allowed for. On the other hand, the moisture content of heavy papers can vary over such a wide range that it is difficult to provide circuit components having a sufficient dynamic range to permit accurate measurement.

In accordance with the present invention, the dynamic range required for the electronic components is reduced by providing feedback of a portion of the detection signal from the capacitance probe to control the signal applied to the probe, so that in the event of a large unbalance in the probe circuit, the larger output signal is used to reduce the input signal, whereby the dynamic range of none of the components is exceeded. Further, the detection signal is then combined with the controlled applied signal to produce a measurement signal quantitatively indicative of the moisture content of the material. This provides an additional advantage in that the measurement signal is independent of the absolute value of the probe drive signal.

Accordingly, it is the primary object of the present invention to provide a new and improved method and system for quantitatively determining the property of a dielectric material. A further object is to provide an improved single frequency measurement method and system for determining the moisture content of material in which the moisture content varies widely. It is still another object of the invention to provide such method and system whereby feedback is utilized to reduce the dynamic range required for the components of the system.

Further objects and features of the present invention will become apparent from the following detailed description, particularly when taken in conjunction with the following drawings, in which:

FIG. 1 is a diagrammatic illustration of a general form of the measuring system of the present invention; and FIG. 2 is a diagrammatic illustration of a preferred form of the signal converter and voltage controlled amplifier used in the system illustrated in FIG. 1.

In FIG. 1 there is illustrated a simplified form of a system utilizing the present invention. As shown in FIG. 1, an oscillator 10 provides an alternating current electrical signal. The frequency of the signal is chosen according to the particular measurement to be made. Frequencies from 10 kilohertz to 1 megahertz have been found useful. The higher frequencies are useful for measurements of relatively high moisture content. An electrical signal from the oscillator 10 is applied over a lead 12 to a voltage controlled amplifier 14. The voltage controlled amplifier 14 produces a signal at the frequency of the oscillator 10 and of a magnitude dependent upon the magnitude of a control signal applied over a lead 16 to the control terminal of the voltage controlled amplifier 14. The output of the voltage controlled amplifier 14 is applied over a lead 18 to the probe electronics contained at a probe head 20 which may be some distance remote from the rest of the circuit. The lead 18 may, therefore, be a relatively long line. The oscillator 10 and the voltage controlled amplifier 14 may be considered collectively as a source of the applied alternating current electrical signal as applied to the probe head 20.

In the probe head 20, the applied signal is applied through an excitation amplifier 22, which inverts the applied signal and applies the inverted signal over a lead 24 to one plate or electrode 26 of a capacitance probe 28, which has a second plate or electrode 30. As shown, the capacitance probe 28 may be a fringe field capacitor with an intermediate grounded electrode 32 between its plates 26 and 30. The material to be measured, such as a sheet 34, is disposed in the fringe field of the capacitance of the probe 28. The sheet 34 to be measured is formed of a dielectric material which, therefore, determines the admittance of the probe 28. More particularly, an increase in relative moisture increases the admittance of the probe. Thus, the signal as applied at the plate 26 is influenced by the material, and produces an output signal on the lead 36 connected to the plate 30. This output signal is applied to a detector amplifier 38. A probe load capacitor 40 is connected between the lead 36 and ground to develop the output signal. The detector amplifier 38 operates to drive a lead 42, which like the lead 18, may be a relatively long line connecting the probe head 20 to the rest of the circuit.

As shown, the signal on the lead 42 is passed through a filter 44 tuned to the frequency of the oscillator 10. This reduces or eliminates noise or harmonics that may have been produced in the system, and produces on a lead 46 an alternating current detection signal, the magnitude of which is dependent upon the dielectric constant of the sheet 34 and, therefore, on its moisture content. This detection signal would be in large measure determined by the capacitance of the probe itself, were it not for a balancing signal as provided by a balancing capacitor 48 coupled between the lead 18 and the lead 36.

The signal as applied through the balancing capacitor 48 is opposite in phase to the signal applied to the probe electrode 26 on the lead 24. Its magnitude is determined by the capacitance of the balancing capacitor 48, which is adjusted so that in the absence of material 34 at the probe 28, the signal at the lead 46 is substantially zero. This balances out the effect of the empty probe on the detection signal, that is, the effect of probe capacitance in the absence of material 34. The detection signal then becomes a measure of the unbalance of the probe circuit as occasioned by the component of admittance produced by the relative moisture content of the sheet 34. Actually, the balancing circuit may take a number of forms. For example, the capacitance of the capacitor 48 may be remotely controlled. It is also possible to use an inverting amplifier in the balancing circuit rather than using the excitation amplifier 22 in the direct circuit to the probe.

The lead 46 applies the alternating current detection signal to a demodulator and detector 50, which demodulates or detects the alternating current signal to produce a direct current detection signal on an output lead 52. This direct current detection signal on the output lead 52 provides an indication of the moisture content of the sheet 34.

For the materials for which the system is most useful, the range of moisture content occasions a change in output signal over a range of about 400 to 1 for a given fixed applied signal on the lead 18. This places great demand on the dynamic range required for excitation amplifier 22, detector amplifier 38, and the demodulator 50, if accurate quantitative measurements are to be made. To reduce this demand, a control signal is applied to the control terminal of the voltage controlled amplifier 14 to reduce the applied signal on the lead 18, as the detection signal on the lead 52 increases. This control signal is developed on the lead 16 by a signal converter 54 to which the detection signal is applied over a lead 56 connected to the lead 52. The characteristic of the signal converter 54 produces a control signal that is monotonically related to the detection signal over the range of measurement. It is the function of the signal converter 54 to produce a control signal that will produce on the lead 18 an applied signal that changes as the detection signal changes but in the opposite direction.

The applied signal on the lead 18 is also applied over a lead 58 to a demodulator 60, which may be substantially identical to the demodulator 50 and operate in the same fashion to convert an alternating applied signal to a corresponding direct current signal which is a measure of the applied signal. As the detection signal on the lead 52 is itself indicative of moisture content only for a predetermined applied signal, when the applied signal is varied in the manner described, it is the ratio of the detection signal to the applied signal that is indicative of the moisture. Thus, the detection signal on the lead 52 is applied over a lead 62 to a ratio-taking unit 64, and the direct current signal from the demodulator 60 is applied over a lead 66 to the same ratio-taking unit 64, which operates in a conventional manner to produce a signal indicative of the ratio of the signals on the respective leads 62 and 66 and, hence, of the ratio of the detection signal to the applied signal. This ratio is indicative of the moisture content and can be calibrated empirically. The ratio signal may be applied to a recorder 68 or to a meter or to a control circuit, as desired. The ratio may vary over a wide range, but neither of the two input signals of the ratio-taking unit 64 varies over a wide range, and the dynamic range of the output of the ratio-taking unit is not so critical as the dynamic ranges of the demodulators 50 and 60 and the detector amplifier 38.

It was mentioned that the signal converter in association with the voltage controlled amplifier caused the applied signal to change as the detection signal on the lead 52 changes to balance the dynamic range required for the demodulators 50 and 60. Thus, were the system to require a dynamic range of 400, the dynamic range of each of the demodulators could be made only 20, which may reasonably be achieved with considerable accuracy. To achieve this balance of demodulator ranges, the signal converter 54 may be a non-linear network such as a square rooter. Such a signal converter 54 is shown in FIG. 2 in association with a preferred form of voltage controlled amplifier 14. As shown, the square rooter may take the form of a feedback amplifier having a plurality of feedback circuits to provide different feedback characteristics at different signal levels. This produces a characteristic for the circuit made up of a number of straight line segments, which can be made to reproduce a square root function as closely as desired. More particularly, signal converter 54 for producing a square root function may include an input resistor 70 coupled to the input of an amplifier 72.

The output of the amplifier 72 is fed back to the input of the amplifier over a plurality of paths. One such path includes only the resistor 74. Another path consists of a diode 76 and resistors 78 and 80. Another path consists of diode 82 and resistors 78, 84 and 86. Still another path consists of a diode 88 and resistors 78, 84, 90 and 91. The series of resistors 78, 84, 90 and 92 are connected to a voltage source which is positive with respect to ground, so as to bias the respective diodes 76, 82 and 88 to conduct only upon reaching certain respective selected voltage levels. As each respective diode conducts, the resistance in the feedback path changes, thus changing the slope of the characteristic of the feedback amplifier.

With the circuit illustrated, the characteristic will consist of four line segments, which, upon appropriate selection of the biases and resistances, can be made to approximate a square root function. The voltage appearing on the lead 16 is then a negative direct current signal related to the square root of the detection signal applied over the lead 56 to the input resistor 70. This signal on the lead 16 is a control signal for controlling the amplitude of voltage controlled amplifier 14, which may take the form shown in FIG. 2.

The voltage controlled amplifier 14 as shown in FIG. 2 is comprised of a control section 93 and an amplifier section 94. The amplifier section 94 is shown as a three-stage amplifier; however, greater or fewer stages may be utilized as desired.

The control is based upon the use of FETs as controllable resistors. The control signal on the lead 16 is processed by the control section 93 and the processed signal is applied on a lead 95 through respective isolating gate resistors 96, 97 and 98 to the gates of respective FETs 100, 102 and 104.

The FET 100 is connected in the input circuit on an amplifier stage 106. It is connected in series with an input coupling resistor 108 to ground with an isolating capacitor 110 therebetween. The input signal from the oscillator 10 is applied over the lead 12 to the series connected resistor 108 and FET 100 which act together as a voltage divider. The magnitude of the signal developed at the junction 112 between the resistor 108 and capacitor 110 depends upon the resistance of the FET 100, which in turn is controlled by the magnitude of the voltage applied to its gate through the resistor 96. Thus, the control signal developed on lead 16, operating through the control section 93, controls that portion of the alternating current electrical signal developed by the oscillator 10 that is applied to the first amplifier stage 106, thus determining the output of the amplifier stage 106. This output is applied through an input coupling resistor 114 to a second amplifier stage 116.

As in the first stage, the FET 102 is connected in series with the resistor 114 to ground with an intermediate isolating capacitor 118. The impedance of the FET 102 is controlled by the control signal on lead 16 in the same manner as the impedance of FET 100 is controlled, and operates to determine that portion of the output of amplifier stage 106 that is developed on the junction 120 between the resistor 114 and the capacitor 118 for application to the second amplifier stage 116.

In the same fashion, an input coupling resistor 122 and an isolating capacitor 124 are connected in series with the FET 104, which is controlled by the control signal on lead 16 to determine that portion of the output of the second amplifier stage 116 that is developed at the junction 126 between the resistor 122 and the capacitor 124 for application to the third amplifier stage 128, which develops the applied signal on the lead 18.

The components of the control section 93 in association with the signal from the signal converter 54 produces the desired response whereby the applied signal on lead 18 varies appropriately in response to a change in the detection signal on lead 52.

As shown in FIG. 2, the control section 93 may comprise an adjustable input resistor 130, to which the control signal is applied over the lead 16. The input resistor 130 is connected to the input circuit of an amplifier 132, the output of which is connected to the lead 95. The amplifier 132 is connected to ground through a resistor 134. A second input signal is applied to the input circuit of the amplifier 132 through an input resistor 136. This second input is obtained from a voltage divider 138 connected between sources of potential respectively positive and negative relative to ground in order to select a desired positive or negative reference signal. The amplifier 132 is connected as a summing amplifier by virtue of a feedback resistor 140 connected between its output and input terminals. A capacitor 142 is connected in shunt with the resistor 140 to establish a desired time constant for the response of the voltage controlled amplifier, thus assuring proper stability to the circuit.

With the circuit as thus far described, the setting of the variable resistor 130 effectively determines the characteristic of the control section. The setting of this resistor 130 sets the gain of the control section. This adjustment of the resistor 130 thereby determines the effect of the control signal upon the output of the voltage controlled amplifier on lead 18. At the same time the reference signal applied through the second input resistor 136 provides an offset signal which may be said to set the starting point for the control of the voltage controlled amplifier 14. In particular, it is preferred that the voltage divider 138 be adjusted to cause the voltage controlled amplifier to produce maximum voltage when the moisture content of the sheet 34 is at the bottom of the range of measurement. For example, the amplifier may be caused to produce 100 volts for a dry sheet. In a particular circuit that has been built, this required −3.4 volts DC on the lead 95. With a control signal on lead 16 indicative of dry paper at the one limit of the range of measurement of the system for a particular measurement, the voltage divider 138 was adjusted to cause the control section 93 to produce −3.4 volts DC on the lead 95. For measurements where the measurement signal would otherwise vary by a factor of 400, the resistor 130 is adjusted so that when the signal input on lead 16 varies over the measurement range, the voltage developed on the lead 95 causes the output of the voltage controlled amplifier 14 to be reduced by a factor of 20 to a level of 5 volts at the high moisture level.

Under certain conditions of operation, such as when material 34 is removed from the probe 28 for standardizing, a control signal may be developed which is outside of the control range. In order to protect the circuit, a clamping transistor 144 is used to limit the input of the amplifier 132 to a voltage level that produces an output voltage from the voltage controlled amplifier 14 which is only slightly greater than its nominal maximum output. The limit level is determined by the adjustment of a voltage divider 146 connected between a negative power source and ground. The movable contact of the voltage divider is connected to the base of the transistor 144, which may be of the NPN type. The emitter of the transistor is connected to the lead 95, so that any time the voltage on the lead 95 is less than the voltage on the base of the transistor 144 (that is, the magnitude of the negative signal on the lead 95 exceeds the magnitude of the negative bias on the base), the transistor 144 conducts, drawing current through the diode 148 connected between the collector of the transistor 144 and the input circuit of the amplifier 132. A resistor 150 is connected between the collector of the transistor 144 and ground to provide sharp operation for the clamping transistor. That is, as the voltage on the lead 95 approaches the limiting voltage, current is first drawn through the resistor 150, and then suddenly, the diode 148 conducts. The diode 148 serves to prevent leakage currents in the transistor from influencing the control section when the transistor is cut off. A diode 152 is connected between the output and input of the amplifier 132 to keep the output terminal from going positive relative to the input terminal.

Various modifications may be made in the circuit within the scope of the present invention. For example, the recorder 68 may include conventional linearizing circuits to make the recorder respond linearly to variations in moisture. Other signal converters may be used. Preferably the characteristics of the signal converter are non-linear with the slope of the control signal as a function of the detection signal decreasing with increasing detection signal over the range of measurement.

What is claimed is:

1. Apparatus for the quantitative determination of a property of a dielectric material, said apparatus comprising a source of alternating current electrical signal at a constant frequency, said source including control means responsive to a control signal for controlling the magnitude of said signal from said source, detecting means, capacitance probe means coupled to said source and having spaced electrodes arranged for applying said electrical signal from said source to at least a portion of said material and coupling said detecting means to said portion, said detecting means including means for deriving a detection signal resulting from the signal as applied to said portion from said source as this applied signal is influenced by said material, balancing circuit means connected in circuit with said probe means to balance out from said detection signal any component developed by said probe means in the absence of said material, a signal converter coupled to said detecting means and responsive to said detection signal by producing a derived signal monotonically related to said detection signal over the range of measurement, means for applying said derived signal to said control means as a control signal to change the magnitude of said signal from said source oppositely from any change in the magnitude of said detection signal, and ratio-taking means coupled to said signal converter and said source and responsive to said derived signal and said signal from said source to produce a signal systematically related to the ratio of said derived signal and said signal from said source and hence indicative of said property.

2. Apparatus according to claim 1 wherein said signal converter is a square rooter and said derived signal varies substantially as the square root of the magnitude of said detection signal.

3. Apparatus according to claim 1 wherein the characteristic of said signal converter makes the slope of said derived signal as a function of said detection signal decrease with increases in said detection signal over the range of measurement.

4. Apparatus according to claim 1 wherein the characteristic of said signal converter makes the range of said signal from said source substantially equal to the range of said detection signal over the range of measurement.

5. Apparatus according to claim 1 wherein said detecting means derives an alternating current detection signal and comprises a first demodulator for demodulating said alternating current detection signal to produce a corresponding direct current detection signal for application to said signal converter; and wherein said ratio-taking means includes a second demodulator for demodulating said signal from said source to produce a direct current source signal, and means responsive to said direct current detection signal and said direct current source signal for producing a signal systematically related to the ratio thereof.

6. A method for the quantitative determination of a property of a dielectric material, said method comprising applying a constant frequency alternating current electrical signal of controlled magnitude to a pair of spaced electrodes of a capacitance probe, deriving a detection signal resulting from the applied signal as this applied signal is influenced by said material while at the same time balancing out from said output signal any effect of the capacitance between said electrodes in the absence of said material, deriving from said detection signal a derived signal monotonically related thereto over the range of measurement, utilizing said derived signal to control the magnitude of said applied signal by changing said magnitude oppositely to any change in said detection signal, and combining said derived signal and a signal indicative of said applied signal to produce a signal systematically related to the ratio of said detection signal and said applied signal and hence indicative of said property.

7. The method according to claim 6 wherein said derived signal varies substantially as the square root of said detection signal.

8. The method according to claim 6 wherein the slope of said derived signal as a function of said detection signal decreases with increases in said detection signal over the range of measurement.

9. The method according to claim 6 wherein the magnitude of the applied signal is controlled to vary over a range substantially equal to the range of the detection signal over the range of measurement.

* * * * *